United States Patent
Michikura et al.

[11] Patent Number: 6,080,072
[45] Date of Patent: Jun. 27, 2000

[54] BELT HANDLING SYSTEM

[75] Inventors: Hiromi Michikura, Akashi; Shinji Kotani, Hyogo, both of Japan

[73] Assignee: Mitsuboshi Belting Ltd., Hyogo, Japan

[21] Appl. No.: 09/044,957

[22] Filed: Mar. 20, 1998

[30] Foreign Application Priority Data

Mar. 21, 1997 [JP] Japan .................................. 87394/97

[51] Int. Cl.[7] .............................. B23Q 7/10; B65G 15/60; F16H 7/08
[52] U.S. Cl. .............................. 474/101; 29/809; 198/812
[58] Field of Search .................................. 474/101, 111, 474/237; 73/862.25; 29/822, 809; 198/812

[56] References Cited

U.S. PATENT DOCUMENTS

| 4,793,057 | 12/1988 | Kamiyama et al. | 29/822 |
| 5,201,406 | 4/1993 | Kellis | 198/812 |

*Primary Examiner*—David A. Bucci
*Assistant Examiner*—Marcus Charles
*Attorney, Agent, or Firm*—Wood, Phillips, VanSanten, Clark & Mortimer

[57] ABSTRACT

A belt handling system has a belt storage subassembly, a testing pulley subassembly, and a belt transfer subassembly. The testing pulley subassembly has first and second spaced, rotatable pulleys around which a belt to be treated can be trained. The belt transfer subassembly is operable to transfer a belt at the belt storage subassembly into an operative position trained around the first and second pulleys. The testing pulley subassembly has a belt removal unit which is repositionable between first and second positions. A belt trained around the first and second pulleys is movable from an engaged state with the first pulley wherein a belt trained around the first and second pulleys follows rotational movement of the first pulley and a disengaged state wherein the first pulley can be rotated without causing a belt trained around the first and second pulleys to follow rotational movement of the first pulley.

24 Claims, 5 Drawing Sheets

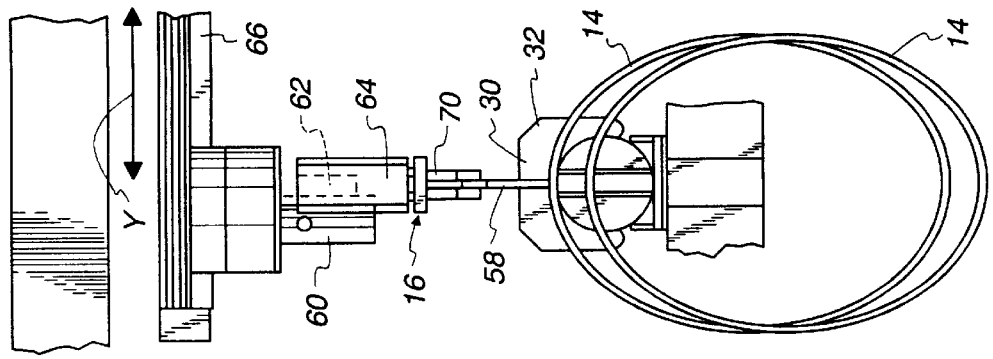
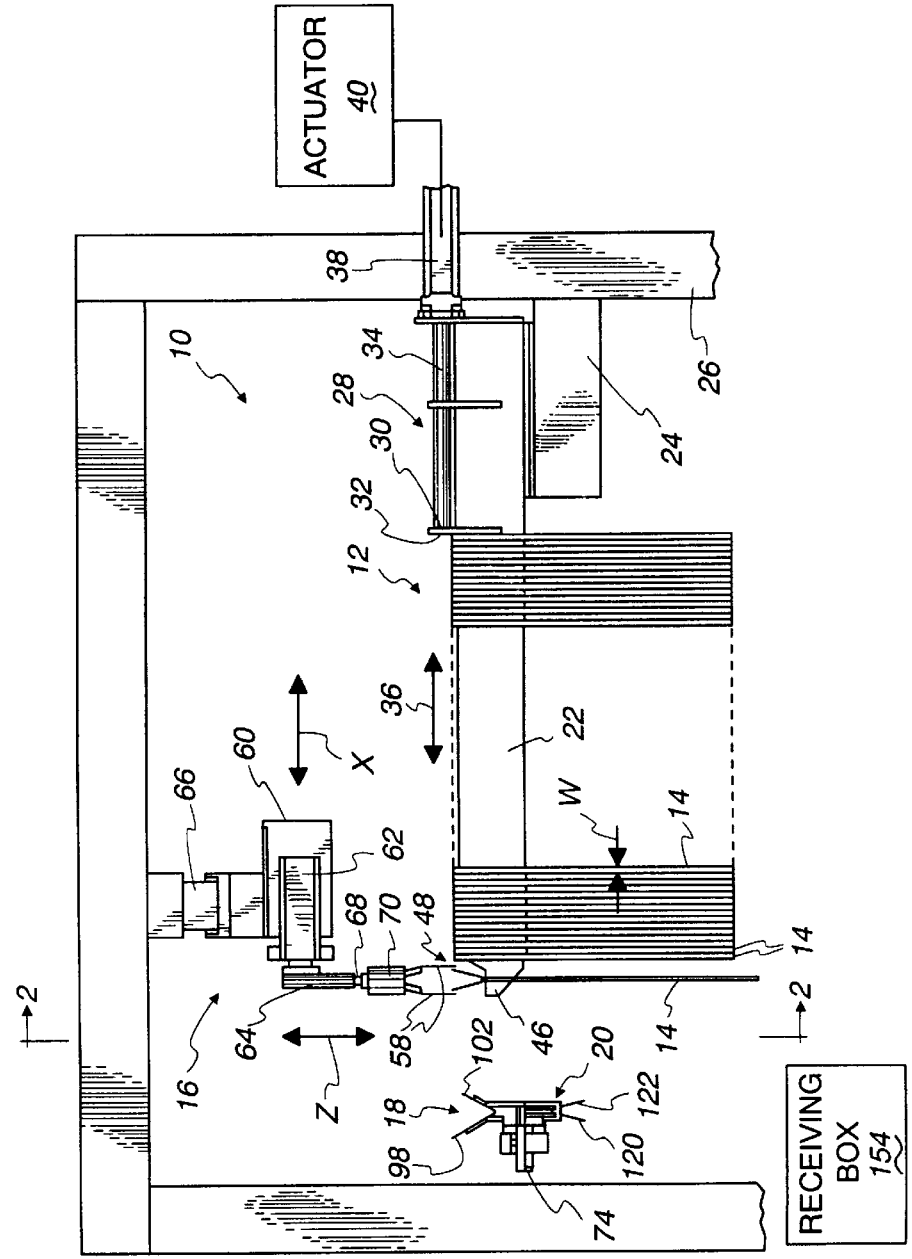

BELT HANDLING SYSTEM

BACKGROUND OF THE INVENTION

1. Field of the Invention

This invention relates to endless belts, such as power transmission belts, and, more particularly, to a belt handling system for placing a belt in an operative position to be driven around spaced pulleys and for selectively repositioning the belt relative to the pulleys from an engaged state into a disengaged state wherein the belt is not driven as one or both of the pulleys are rotated.

2. Background Art

It is well known to manually mount a power transmission belt around a pair of spaced pulleys and to change the relative position of the pulleys to increase and decrease the tension applied to a belt trained therearound. It is also known to move the pulleys closer together to release tension on the belt and then to manually separate the belt from the pulleys.

Automated sizing equipment is now used in the belt manufacturing process. Typically, raw edged belts with V-shaped ribs are cut from a belt sleeve and are trained around a pair of pulleys to ascertain the length thereof. The effective operating length of the belt may be varied by grinding the side surfaces thereof so that the belt seats more deeply within the pulley grooves and is thereby effectively lengthened. The automated equipment is used to measure and produce the desired grinding on the side surfaces. The equipment then causes the belts to be separated from the pulleys.

As an example of this type of equipment, in Japanese Patent Publication No. H1-23043, a belt processing apparatus is shown for training a belt around a drive pulley and a spaced pulley which is movable relative to the drive pulley to vary the tension on the belt trained around the pulleys and to separate the belt at the appropriate time in the manufacturing process from the pulleys. To remove the belt from the pulleys, the movable pulley is moved closer to the drive pulley to release the tension on the belt. A hanger, adjacent to the drive pulley, through operation of a cylinder, engages and lifts the belt off the pulleys, separates the belt from the pulleys, and deposits the separated belt into a reception box.

However, even after the tension is reduced on the belt by relatively repositioning the pulleys, the drive pulley continues to rotate and drags the loosely wrapped belt in an endless path around the pulleys. This condition may make it difficult to engage the belt with the hanger and effect repositioning thereof through the hanger.

SUMMARY OF THE INVENTION

In one form of the invention, a belt handling system has a belt storage subassembly, a testing pulley subassembly, and a belt transfer subassembly. The testing pulley subassembly has first and second spaced, rotatable pulleys around which a belt to be treated can be trained. The belt transfer subassembly is operable to transfer a belt at the belt storage subassembly into an operative position trained around the first and second pulleys. The testing pulley subassembly has a belt removal unit which is repositionable between first and second positions. A belt trained around the first and second pulleys is movable from an engaged state with the first pulley wherein a belt trained around the first and second pulleys follows rotational movement of the first pulley and a disengaged state wherein the first pulley can be rotated without causing a belt trained around the first and second pulleys to follow rotational movement of the first pulley.

In one form, the first and second pulleys are rotatable around substantially parallel, spaced, first and second axes and at least one of the first and second pulleys is movable relative to the other of the first and second pulleys to thereby vary the spacing between the first and second axes.

In one form, the belt storage subassembly has a cantilevered support arm around which a plurality of belts can be wrapped and a pusher plate that is movable to simultaneously reposition a plurality of belts wrapped around the cantilevered support arm to place a belt in the plurality of belts in a transition location to be picked up by the belt transfer subassembly.

In one form, the belt transfer subassembly has first and second clamp elements which are relatively movable between an open position wherein a belt can be placed between and removed from between the first and second clamp elements and a closed position wherein a belt can be captively held between the first and second clamp elements.

In one form, the belt removal unit is repositionable between the first and second positions for the belt removal unit by rotation around a first axis.

The first pulley is rotatable around a second axis. The first and second axes may be substantially coincident.

In one form, the belt removal unit is repositionable relative to the first pulley as the belt removal unit repositions between the first and second positions for the belt removal unit.

In one form, the first pulley has a rotational axis and a groove and is defined by first and second facing surfaces which define a first angle therebetween and the belt removal unit has a first plate and a second plate projecting radially outwardly relative to the rotational axis of the first pulley. The first and second plates each have a surface and the surface on the first plate and surface on the second plate cooperatively define a second angle which is substantially the same as the first angle.

In one form, the first pulley has a second rotational axis and defines a groove for receiving a belt and the belt removal unit has a seating surface around which a belt in the operative position wraps and which seating surface projects radially beyond the groove relative to the first rotational axis in one of the first and second positions for the belt removal unit.

The belt removal unit may have first and second elongate pins which project divergingly away from the seating surface.

In one form, a) the first and second plates and b) the seating surface are diametrically opposite to each other relative to the first rotational axis.

In one form, the first plate extends radially outwardly relative to the first rotational axis further than the second plate extends radially outwardly relative to the first rotational axis.

A drive unit may be provided for rotating the belt removal unit through increments on the order of 180° around the first axis.

The belt transfer subassembly may be operable to remove a belt from the operative position around the first and second pulleys.

The belt transfer subassembly may have first and second belt clamp elements that are movable relative to each other to selectively hold and release a belt, which clamp elements are movable selectively along three orthogonal axes.

In one form, the belt storage subassembly has a first plate with an inclined surface to guide a belt moving under gravitational forces to a transition location and an upwardly facing surface for supporting a belt in the transition location.

The belt storage subassembly may further have a second plate with substantially the same construction as the first plate and spaced from the first plate such that the first and second plates cooperatively guide a belt into and support a belt in the transition location.

The invention is also directed to a pulley assembly having first and second pulleys around which a belt can be trained, and a belt removal unit which is repositionable relative to the first pulley between first and second positions. A belt trained around the first and second pulleys is movable from an engaged state wherein a belt trained around the first and second pulleys follows rotational movement of the first pulley and a disengaged state wherein the first pulley can be rotated without causing a belt trained around the first and second pulleys to follow rotational movement of the first pulley. The belt removal unit is repositionable between the first and second positions for the belt removal unit by rotation around a first axis.

The invention also contemplates a method of handling a belt, including the steps of delivering a belt into an operative position around first and second pulleys wherein at least one surface on each of the first and second pulleys engages the belt, rotating the first pulley to drive the belt in an endless path around the first and second pulleys and disengaging the belt from the at least one surface on the first pulley so that the first pulley can be rotated without causing the belt to be driven in the endless path.

The step of disengaging the belt may involve the step of rotating a belt removal unit around an axis to cause a seating surface on the belt removal unit to engage and reposition the belt.

BRIEF DESCRIPTION OF THE DRAWINGS

FIG. 1 is a front elevation view of a belt handling system, according to the present invention.

FIG. 2 is an enlarged, fragmentary, cross-sectional view of the belt handling system taken along line 2—2 of FIG. 1;

DETAILED DESCRIPTION OF THE DRAWINGS

Figure 3:
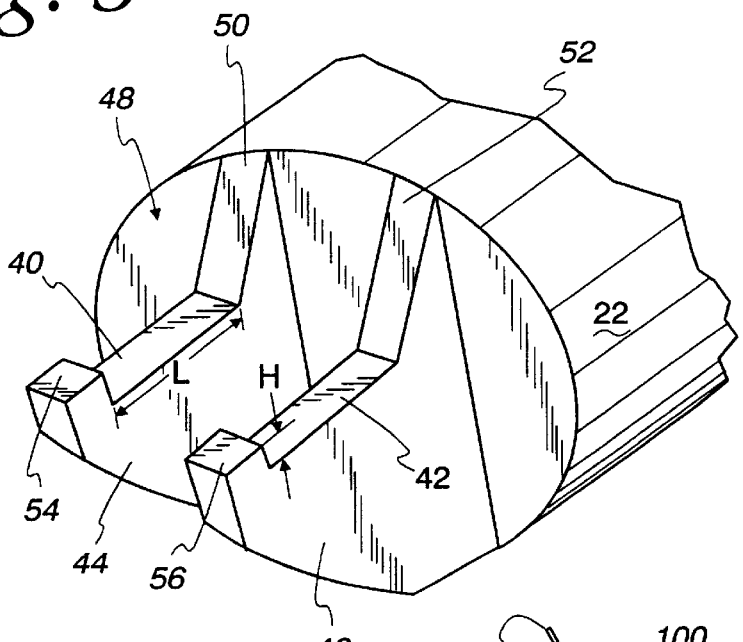
FIG. 3 is an enlarged, fragmentary, perspective view of a pair of plates on a belt storage subassembly on the belt handling system in FIG. 1 for holding individual belts in a transition location.

In FIG. 1, a belt handling system, according to the present invention, is shown at 10. The belt handling system 10 consists of a storage subassembly 12 for a supply of endless belts 14, a belt transfer subassembly 16, and a testing pulley subassembly 18 including a belt repositioning mechanism 20 which facilitates the removal of the individual belts 14 mounted to the testing pulley subassembly 18.

The belt storage subassembly 12 consists of a cantilevered support arm 22 around which the individual belts 14 are draped in side-to-side abutting relationship. The support arm 22 is maintained in the operative position of FIG. 1 by a cantilevered hanger 24 mounted to a vertical support element 26.

A pusher assembly at 28 consists of an inverted, U-shaped pusher plate 30 with a surface 32 to engage the endmost belt 14 carried by the support arm 22. The pusher plate 30 is fixedly mounted to a rod 34 which is reciprocatable in the line of the double-headed arrow 36 by a cylinder 38 that is operable by an actuator 40. The actuator 40 is operable to advance the pusher plate 30 from right to left in FIG. 1 in increments corresponding to the width W of a single belt 14.

As seen in FIGS. 1 and 3, each incremental movement of the cylinder 38 causes a single belt 14 and to be advanced to a transition location, as seen in FIG. 1, wherein the belt 14 bridges, and is supported by, upwardly facing surfaces 40, 42 on a pair of spaced plates 44, 46 mounted at the free, distal end 48 of the support arm 22. The plates 44, 46 have the same construction. The plates 44, 46 have inclined guide surfaces 50, 52 which direct the endmost belt 14 at the free distal end 48 of the support arm 22 downwardly towards the surfaces 40, 42 towards the transition location. Upward projections 54, 56 confine the belts 14 sliding downwardly on the guide surfaces 50, 52 to the transition location on the surfaces 40, 42. The height H of the projections 54, 56 is chosen so that the individual belts 14 do not slide off of the plates 44, 46. The surfaces 40, 42 have a length L chosen to cooperatively provide a stable support for the belts 14 in the transition location.

The plates 44, 46 are spaced, each from the other, sufficiently to allow belt clamping elements 58 on the belt transfer subassembly 16 to grasp the unsupported portion of the belt 14 in the transition location between the plates 44, 46. While the use of a single plate 44, 46 is possible, the supporting surface on such plate 44, 46 which would contact the belt 14 in the transition location becomes relatively small. As a consequence, the belt 14 may be unstably supported and/or may be supported in inconsistent orientations, thereby making it difficult to be picked up by an appropriate clamp arrangement. This construction may also require a modification to the clamp arrangement that might make the clamp arrangement complicated. In short, picking up of the belt 14 may generally be more difficult through a clamp arrangement with a single plate 44, 46 than with the two plate arrangement disclosed.

Figure 6:
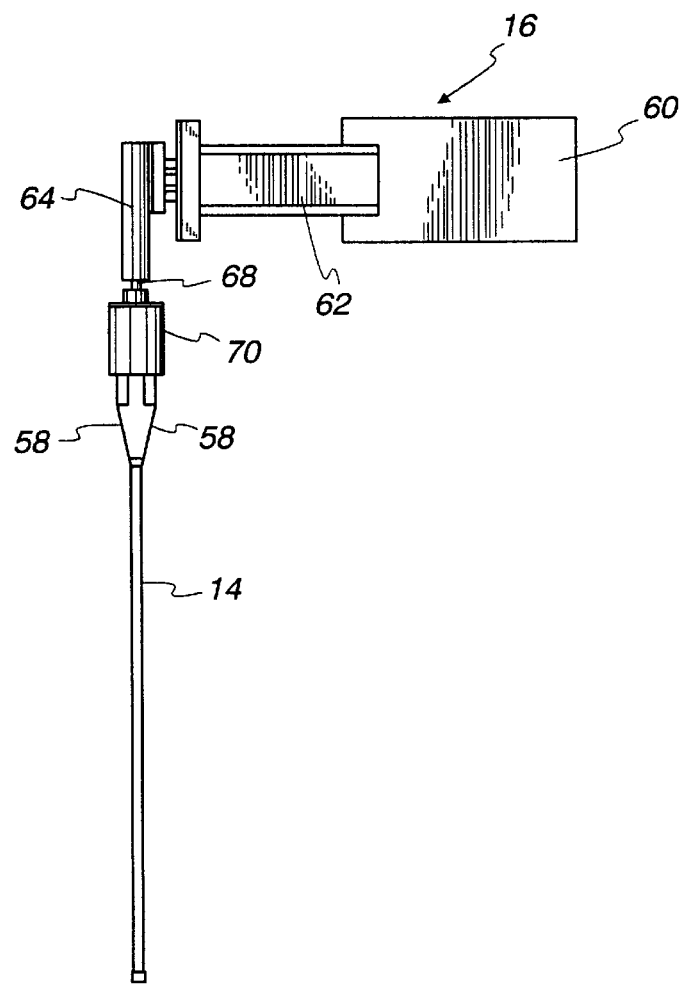
FIG. 6 is an enlarged, front elevation view of a part of a belt transfer subassembly on the belt handling system of FIG. 1 and showing a belt being carried thereby.

The belt transfer subassembly 16 is constructed to impart a three axis movement to the belt clamp elements 58 as shown in FIGS. 1, 2 and 6. The belt transfer subassembly 16 has first and second cylinders 60, 62 for moving the belt clamp elements 58 from the standby position of FIG. 1 along the X axis towards the testing pulley subassembly 18. The cylinder 60 moves the cylinder 62 along the X axis and the cylinder 62 in turn moves a separate cylinder 64 along the X axis. The cylinder 64 is operable to move the belt clamp elements 58 vertically along the Z axis. A cylinder 66 is operable to simultaneously move the cylinders 60, 62, 64 and belt clamp elements 58 along the Y axis. The cylinder 64 connects through a rod 68 to a chuck 70 through which the belt clamp elements 58 are selectively opened and closed, i.e. moved towards and away from each other. The cylinder 66 may be a rodless cylinder.

Figure 4:
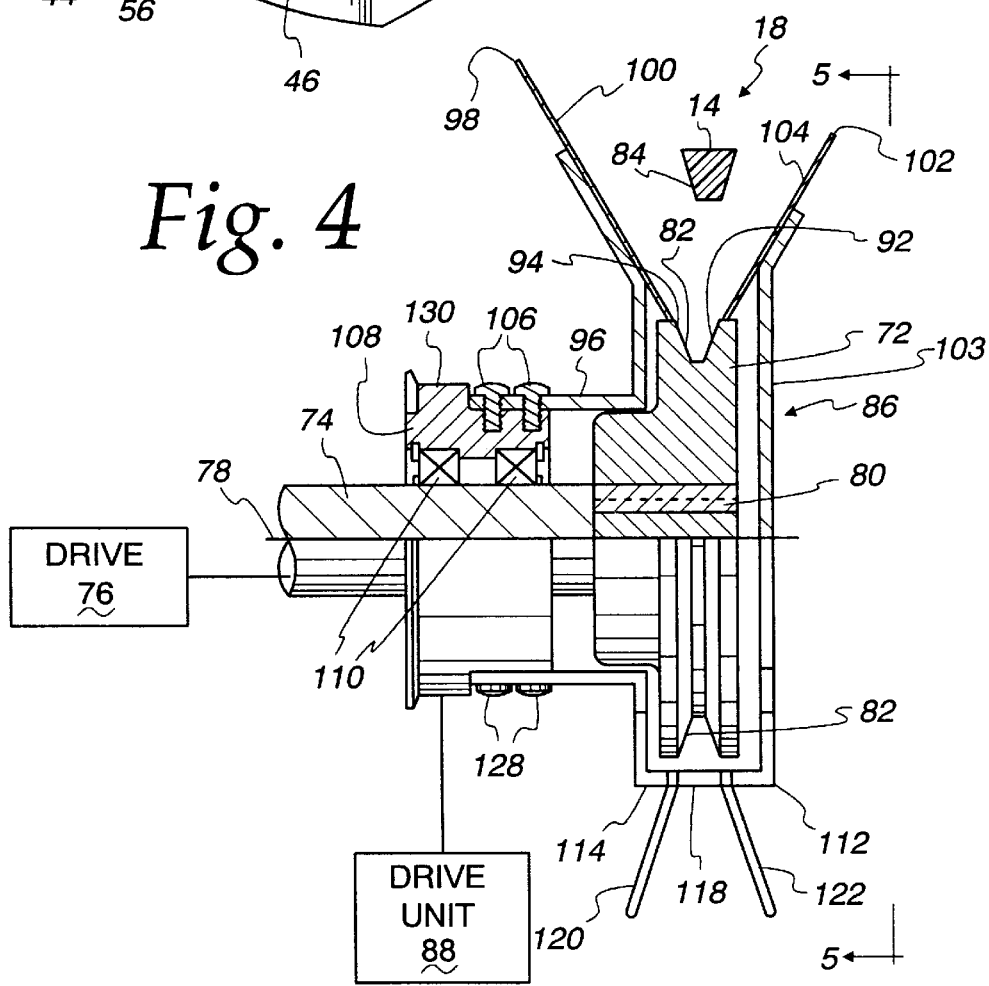
FIG. 4 is an enlarged, fragmentary, partial cross-sectional view of a testing pulley subassembly on the belt handling system of FIG. 1.
Figure 5:
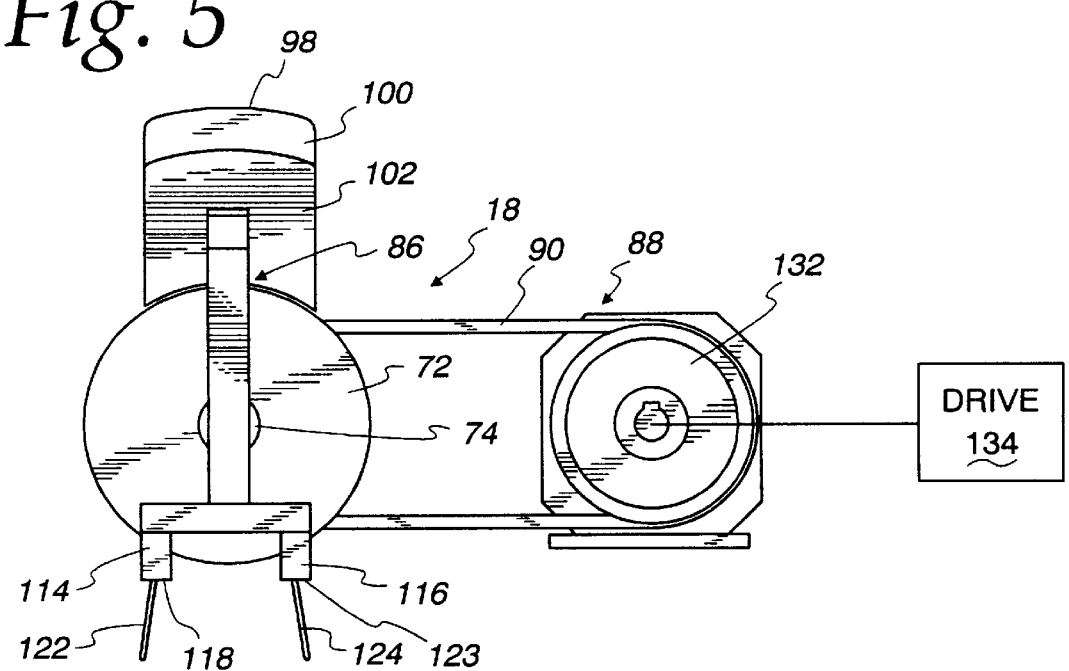
FIG. 5 is an enlarged view of the testing pulley subassembly taken along line 5—5 of FIG. 4.

In FIGS. 4 and 5, the details of the testing pulley subassembly 18 are shown. The testing pulley subassembly 18 consists of a pulley 72 that is mounted to a shaft 74 rotated by a drive 76 around an axis 78. A key 80 acting between the pulley 72 and shaft 74 causes the pulley 72 to follow rotational movement of the shaft 74. The pulley 72 has a groove 82 that is complementary to a rib 84 on each belt 14.

A belt removal unit 86 is mounted to the shaft 74 for rotation relative thereto around the axis 78. Through a drive unit 88, a belt 90 is driven to rotate the belt removal unit 86 through a predetermined range, as described hereafter.

While a single groove 82 is shown in the pulley 72 to be complementary to the belt 14, a pulley 72 can be provided with a groove or multiple grooves to be complementary to virtually any type of belt construction. In the event a flat belt is used, no groove is required.

In this particular construction, the groove 82 is bounded by facing groove surfaces 92, 94. Through a first bracket piece 96, a flat plate 98 is mounted so that a flat surface 100 defined thereby is coplanar with the plane of the surface 94. Similarly, a shorter, flat plate 102 is mounted through a second bracket piece 103 so that a flat surface 104 thereon is coplanar with the surface 92. The surfaces 92, 94 define with each other a first angle which is equal to a second angle defined by the surfaces 100, 104. For purposes of simplification, the surfaces 92, 94, 100, 104 are characterized herein as flat, when in fact these surfaces are curved and flat only in cross section. The bracket piece 96 is secured by screws 106 to a rotary member 108 that surrounds the shaft 74 and is guided in rotation therearound through spaced bearings 110. The belt plates 98, 102 define a guide portion of the belt removal unit 86 that functions to funnel the individual belts 14 into the groove 82.

Figure 9:
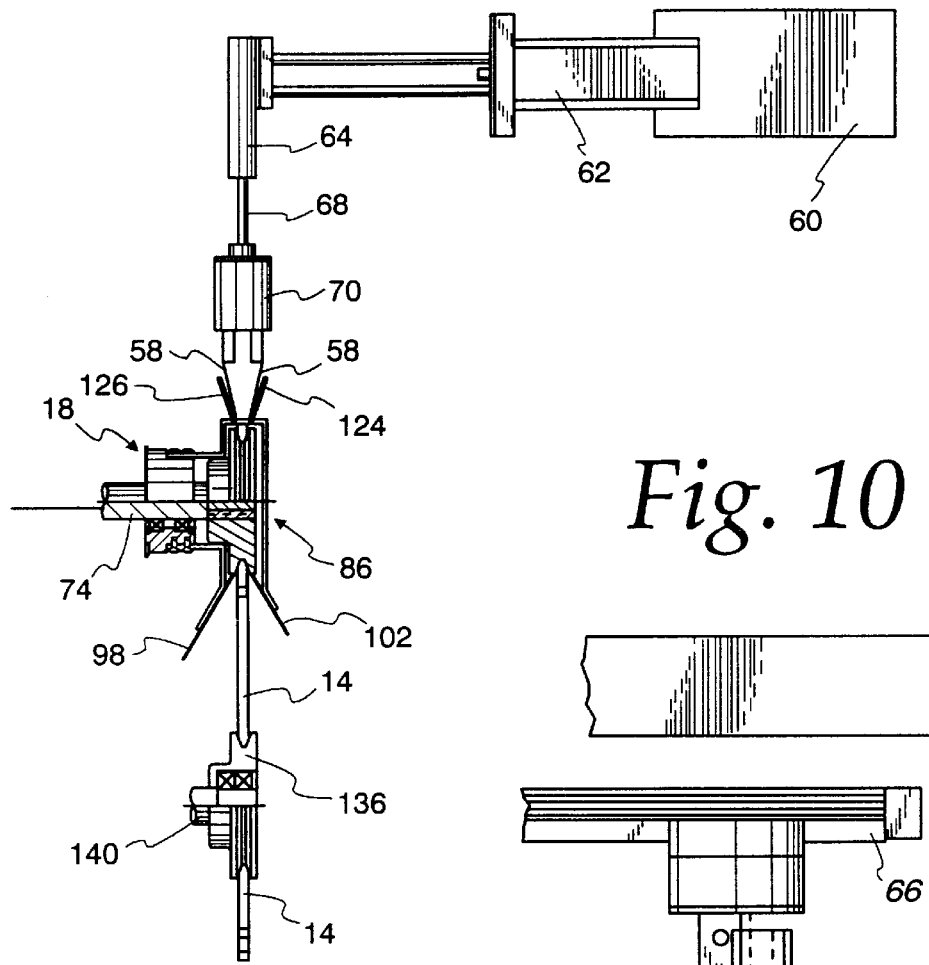
FIG. 9 is an enlarged view as in FIG. 7 showing the part of the belt transfer subassembly re-engaging a belt on the testing pulley subassembly that has been disengaged from spaced pulleys on the testing pulley subassembly as in FIG. 8.
Figure 10:
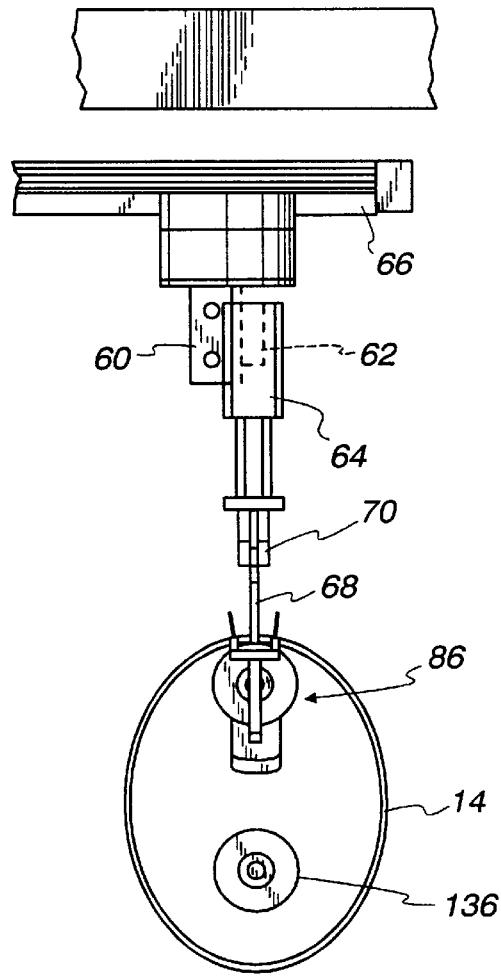
FIG. 10 is an enlarged, side elevation view of the part of the belt transfer subassembly and testing pulley subassembly relatively positioned as in FIG. 9.

A disengaging portion 112 of the belt removal unit 86 is designed to lift a belt 14 in an engaged state with the pulley 72 out of the groove to a disengaged state. The disengaging portion 112 of the belt removal unit 86 is situated diametrically opposite to the guide portion 98, 102 of the belt removal unit 86. The belt disengaging portion 112 of the belt removal unit 86 has spaced support plates 114, 116. The plate 114 has a belt seating surface 118 between two pins 120, 122 which divergingly project away from the belt seating surface 118. The plate 116 has a like seating surface 123 and pins 124, 126 (FIG. 9).

The seating surfaces 118, 123 are located radially outside of the pulley 72. The pins 120, 122, 124 and surfaces 118, 123 cooperatively define a secure receptacle for a belt 14 that is picked out of the pulley 72, as hereafter described. Further, the pins 120, 122, 124 cause the belt 14 to be centered on the seating surfaces 118, 123 as the portion 112 of the belt removal unit 86 is rotated.

The bracket pieces 96, 103 are fixed through screws 106, 128 to the rotary member 108 so that the bracket pieces 96, 103 rotate as one piece with the rotary member 108 relative to the shaft 74 and pulley 72.

The rotary member 108 has a pulley engaging surface 130 to be driven by the belt 90 operated by the drive unit 88. The surface 130 may be flat or toothed depending upon the configuration of the belt 90. The drive unit 88 consists of a pulley 132 operated by a drive 134. The drive 134 causes the pulley 132 to be rotated through a predetermined angle, that is preferably 180°, which effects the corresponding rotation of the portion 112 of the belt removal unit 86.

The shaft 74 with the pulley 72 thereon may be used as a drive and may also be used as a follower. In the latter case, a modified structure, known to those skilled in the art, can be used to cause the pulley 72 to idle relative to the shaft 74.

Figure 7:
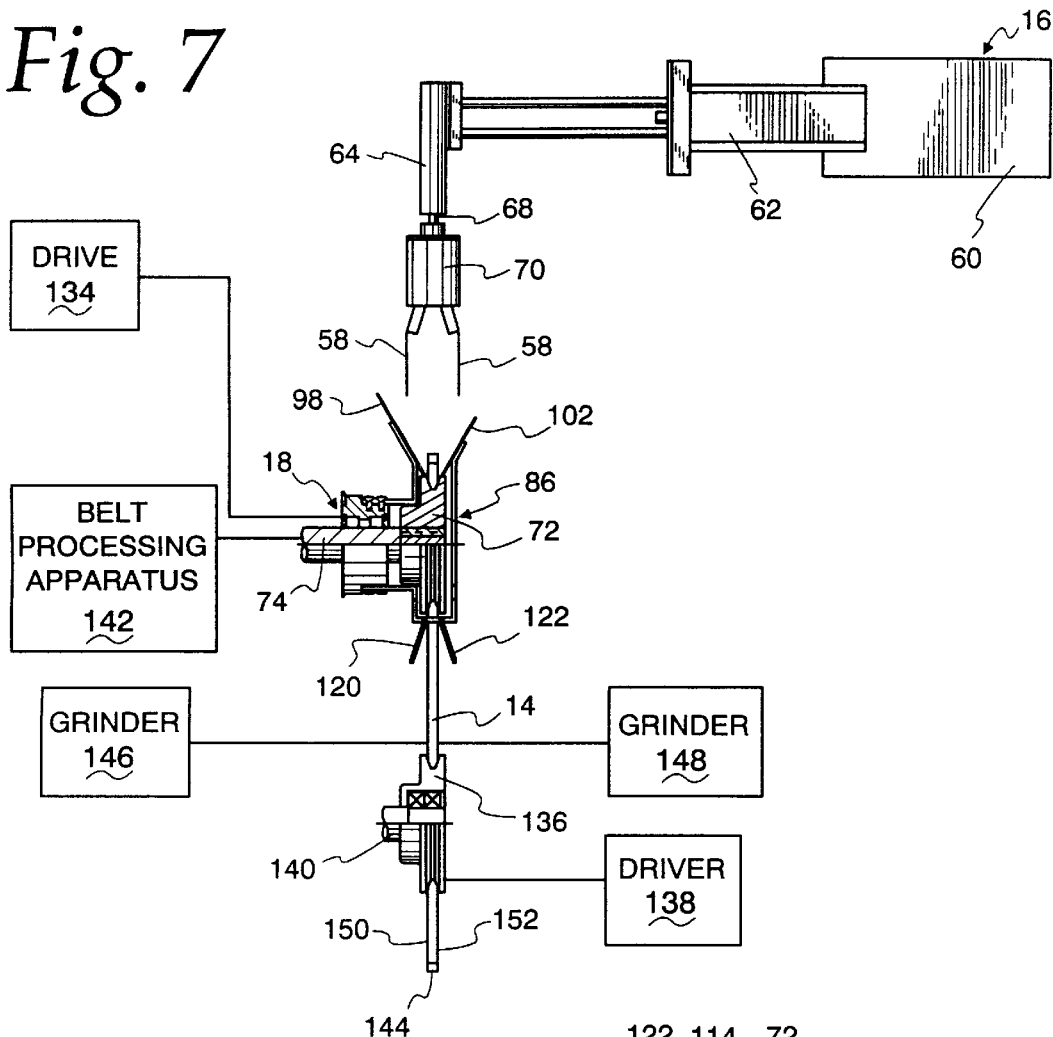
FIG. 7 is an enlarged view of the part of the belt transfer subassembly as in FIG. 6 with the part of the belt transfer subassembly aligned over and releasing a belt into an operative position on the testing pulley subassembly.
Figure 8:
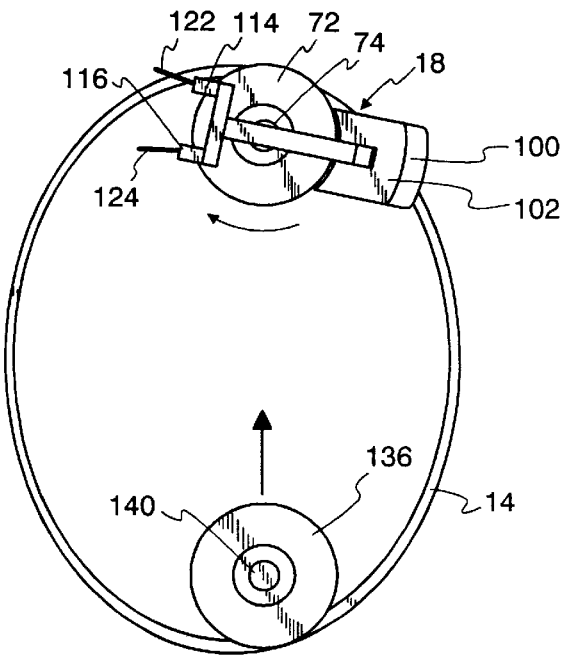
FIG. 8 is an enlarged, side elevation view of the testing pulley subassembly showing a belt removal unit repositioning a belt to cause disengagement of the belt from a pulley on the testing pulley subassembly.

The overall operation of the belt handling system 10 will now be described. In FIG. 1, the belt handling system 10 is shown in a state before the belt 14 in the transition location is picked up by the belt transfer subassembly 16. In FIG. 6, the belt 14 is picked up from the transition location by the belt transfer subassembly 16. FIG. 7 shows the belt handling system 10 in a state in which the belt 14 carried by the belt clamp elements 58 on the belt transfer subassembly 16 is directed between the plates 98, 102 into an operative position trained around the pulley 72 between the plates 98, 102. In FIGS. 8 and 9, the belt 14 is shown being disengaged and removed from the testing pulley subassembly 18.

Referring to FIG. 1, as the pusher plate 30 is moved from right to left through an increment corresponding to the width of the belt 14, the endmost belt at the free distal end 48 of the support arm 22 is directed onto the plates 44, 46 to be guided thereby into the transition location.

The cylinder 64 is operated to advance the chuck 70 and clamp elements 58 downwardly to between the plates 44, 46, whereupon the chuck 70 is operated to move the belt clamp elements 58 towards each other to a closed position to grasp the belt 14 between the plates 44, 46. By then operating the actuator 64 to retract the rod 68 carrying the chuck 70, the belt clamp elements 58, and the belt 14 held thereby, are raised sufficiently that the carried belt 14 clears the upward projections 54, 56.

With the belt removal unit 86 in a first position, shown in FIG. 7, the clamped belt 14 can be repositioned through the belt transfer subassembly 16 so that the belt surrounds the testing pulley subassembly 18 and a movable spacing pulley 136, i.e. is in an operative position. The spacing pulley 136 is guided in movement selectively towards and away from the testing pulley subassembly 18 and is caused to be moved towards and away from the testing pulley subassembly 18 by a drive 138. The spacing pulley 136 is supported on a shaft 140. In this embodiment, the shaft 74 is driven as by a belt processing apparatus 142, which may be a grinder, or the like. The shaft 140 is a follower shaft. Alternatively, the testing pulley subassembly 18 may be mounted on the follower shaft 140 with the movable pulley 136 mounted on the drive shaft 74.

With the belt 14 aligned generally over the groove 82 in the pulley 72, through adjustment along the X axis, the clamp elements 58 can be moved apart, as shown in FIG. 7, to release the belt 14. With the belt removal unit 86 in the first position of FIG. 7, the dropped belt 14 is guided by the plates 98, 102 into the groove 82 in the pulley 72. The spacing between the pulleys 72, 136 is such that the then to lowest portion 144 of the belt 14 draped over the pulley 72 does not contact the spacing pulley 136.

Through the drive 138, the spacing pulley 136 can be moved away from the pulley 72 to tension the belt 14. By then driving the shaft 74 with the belt 14 trained around the pulleys 72, 136, appropriate measurements on the belt 14 can be made. If the measured dimension is such that the width of the belt 14 needs to be reduced to obtain the desired belt running length, grinders 146, 148 can be operated to abrade the belt side surfaces 150, 152, respectively.

At the completion of the grinding operation, the spacing pulley 136 can be raised to release the tension on the belt 14.

At the same time, the drive 134 can be operated to rotate the belt removal unit 86 through 180° to a second position, as shown in FIG. 9. As this occurs, the belt 14 bridges the belt seating surfaces 118, 123 which pick up the belt 14 and progressively lift the belt 14 out of the groove 82. The pins 120, 122, 124, 126 maintain the belt 14 centered in place on the surfaces 118, 123. Since the surfaces 118, 123 project radially outwardly from the groove 82, the rotary action of the belt removal unit 86 results in a disengagement of the belt 14 from the pulley 72. In this state, the belt 14 does not contact either pulley 72, 136 and therefore is not "dragged" by the driven pulley 72 i.e. the belt 14 remains substantially stationary.

Through operation of the cylinder 64, the belt clamp elements 58 can be advanced downwardly to straddle the belt 14, whereupon the chuck 70 can be operated to close the belt clamp elements 58 captively against the belt 14 which is in turn abutted to the belt removal unit 86. By then moving the clamp elements 58 with the belt 14 held thereby in at least one of the X and Y directions, the completed belt 14 can be aligned over and released for deposit into a receiving box 154.

The foregoing disclosure of specific embodiments is intended to be illustrative of the broad concepts comprehended by the invention.

What is claimed is:

1. A belt handling system compromising:
  a belt storage subassembly;
  a testing pulley subassembly comprising first and second spaced rotatable pulleys around which a belt to be tested can be trained; and
  a belt transfer subassembly through which a belt at the belt storage subassembly can be transferred into an operative position trained around the first and second pulleys,
  wherein the testing pulley subassembly comprises a belt removal unit which is repositionable between first and second positions,
  wherein a belt trained around the first and second pulleys is movable from an engaged state wherein a belt trained around the first and second pulleys follows rotational movement of the first pulley and a disengaged state wherein the first pulley can be rotated without causing a belt trained around the first and second pulleys to follow rotational movement of the first pulley as an incident of the belt removal unit repositioning from the first position into the second position,
  said belt removal unit residing between the first and second pulleys with the belt removal unit in the first position.

2. The belt handling system according to claim 1 wherein the first and second pulleys are rotatable around substantially parallel, spaced, first and second axes and at least one of the first and second pulleys is movable relative to the other of the first and second pulleys to thereby vary the spacing between the first and second axes.

3. The belt handling system according to claim 1 wherein the belt storage subassembly comprises a cantilevered support arm around which a plurality of belts can be wrapped and a pusher plate that is movable to simultaneously reposition a plurality of belts wrapped around the cantilevered support arm to place a belt in the plurality of belts in a transition location to be picked up by the belt transfer subassembly.

4. The belt handling system according to claim 1 wherein the belt transfer subassembly comprises first and second clamp elements which are relatively movable between an open position wherein a belt can be placed between and removed from between the first and second clamp elements and a closed position wherein a belt can be captively held between the first and second clamp elements.

5. A belt handling system comprising:
  a belt storage subassembly;
  a testing pulley subassembly comprising first and second spaced rotatable pulleys around which a belt to be tested can be trained; and
  a belt transfer subassembly through which a belt at the belt storage subassembly can be transferred into an operative position trained around the first and second pulleys,
  wherein the testing pulley subassembly comprises a belt removal unit which is repositionable between first and second positions,
  wherein a belt trained around the first and second pulleys is movable from an engaged state wherein a belt trained around the first and second pulleys follows rotational movement of the first pulley and a disengaged state wherein the first pulley can be rotated without causing a belt trained around the first and second pulleys to follow rotational movement of the first pulley,
  wherein the belt removal unit is repositionable between the first and second positions by rotation around a first axis.

6. The belt handling system according to claim 5 wherein the first pulley is rotatable around a second axis and the first and second axes are substantially coincident.

7. The belt handling system according to claim 1 wherein the belt removal unit is repositionable relative to the first pulley as the belt removal unit repositions between the first and second positions.

8. The belt handling system according to claim 7 wherein the first pulley has a rotational axis and a groove defined by first and second facing surfaces which define a first angle therebetween and the belt removal unit comprises a first plate and a second plate projecting radially outwardly relative to the rotational axis for the first pulley, the first and second plates each having a surface, and the surface on the first plate and surface on the second plate cooperatively define a second angle which is substantially the same as the first angle.

9. The belt handling system according to claim 5 wherein the first pulley has a second rotational axis and defines a groove for receiving a belt and the belt removal unit has a seating surface around which a belt in the operative position wraps and which seating surface projects radially outwardly beyond the groove relative to the first rotational axis in one of the first and second positions for the belt removal unit.

10. The belt handling system according to claim 9 wherein the belt removal unit comprises first and second elongate pins which project divergingly away from the seating surface.

11. The belt handling system according to claim 9 wherein the groove is defined by first and second facing surfaces which define a first angle therebetween, the belt removal unit comprises a first plate and a second plate projecting radially outwardly relative to the first rotational axis, the first and second plates each have a surface, the surface on the first plate and the surface on the second plate cooperatively define a second angle which is substantially the same as the first angle, and a) the first and second plates and b) the seating surface are diametrically opposite to each other relative to the first rotational axis.

12. The belt handling system according to claim 11 wherein the first plate extends radially outwardly relative to the first rotational axis further than the second plate extends radially outwardly relative to the first rotational axis.

13. The belt handling system according to claim 12 further comprising a drive unit for rotating the belt removal unit through increments of on the order of 180° around the first axis.

14. The belt handling system according to claim 1 where in the belt transfer subassembly is operable to remove a belt from the operative position around the first and second pulleys.

15. The belt handling system according to claim 1 wherein the belt transfer subassembly comprises first and second belt clamp elements that are movable relative to each other to selectively hold and release a belt and the belt clamp elements are movable selectively along three orthogonal axes.

16. The belt handling system according to claim 1 wherein the belt storage subassembly comprises a first plate having an inclined surface to guide a belt moving under gravitational forces to a transition location and an upwardly facing surface for supporting a belt in the transition location.

17. The belt handling system according to claim 16 wherein the belt storage subassembly comprises a second plate having substantially the same construction as the first plate and spaced from the first plate such that the first and second plates cooperatively guide a belt into and support a belt in the transition location.

18. The belt handling system according to claim 5 wherein the first and second pulleys are rotatable around second and third axes that are substantially parallel to each other and the first axis.

19. A pulley assembly comprising:
   first and second pulleys around which a belt can be trained; and
   a belt removal unit which is repositionable relative to the first pulley between first and second positions,
   wherein a belt trained around the first and second pulleys is movable from an engaged state wherein a belt trained around the first and second pulleys follows rotational movement of the first pulley and a disengaged state wherein the first pulley can be rotated without causing a belt trained around the first and second pulleys to follow rotational movement of the first pulley,
   wherein the belt removal unit is repositionable between the first and second positions by rotation around a first axis.

20. The pulley assembly according to claim 19 wherein the first pulley has a rotational axis and a groove defined by first and second facing surfaces which define a first angle therebetween and the belt removal unit comprises a first plate and a second plate projecting radially outwardly relative to the rotational axis for the first pulley, the first and second plates each having a surface, and the surface on the first plate and surface on the second plate cooperatively define a second angle which is substantially the same as the first angle.

21. A pulley assembly comprising:
   first and second pulleys around which a belt can be trained; and
   a belt removal unit which is repositionable relative to the first pulley between first and second positions,
   wherein a belt trained around the first and second pulleys is movable from an engaged state wherein a belt trained around the first and second pulleys follows rotational movement of the first pulley and a disengaged state wherein the first pulley can be rotated without causing a belt trained around the first and second pulleys to follow rotational movement of the first pulley,
   wherein the belt removal unit is repositionable between the first and second positions by rotation around a first axis,
   wherein the first pulley has a second rotational axis and defines a groove for receiving a belt and the belt removal unit has a seating surface around which a belt in the operative position wraps and which seating surface projects radially outwardly beyond the groove relative to the second rotational axis in one of the first and second positions.

22. The pulley assembly according to claim 21 wherein the groove is defined by first and second facing surfaces which define a first angle therebetween, the belt removal unit comprises a first plate and a second plate projecting radially outwardly relative to the first rotational axis, the first and second plates each have a surface, the surface on the first plate and the surface on the second plate cooperatively define a second angle which is substantially the same as the first angle, and a) the first and second plates and b) the seating surface are diametrically opposite to each other relative to the first rotational axis.

23. A method of handling a belt said method comprising the steps of:
   delivering a belt into an operative position around first and second pulleys wherein at least one surface on each of the first and second pulleys engages the belt;
   rotating the first pulley so that the at least one surface on the first pulley engages and drives the belt in an endless path around the first and second pulleys with a seating surface between the first and second pulleys and spaced from the belt; and
   disengaging the belt from the at least one surface on the first pulley so that the first pulley can be rotated without causing the belt to be driven in the endless path by resituating the seating surface between the belt and the at least one surface on the first pulley.

24. A method of handling a belt, said method comprising the steps of:
   delivering a belt into an operative position around first and second pulleys wherein at least one surface on each of the first and second pulleys engages the belt;
   rotating the first pulley to drive the belt in an endless path around the first and second pulleys; and
   disengaging the belt from the at least one surface on the first pulley so that the first pulley can be rotated without causing the belt to be driven in the endless path,
   wherein the step of disengaging the belt comprises the step of rotating a belt removal unit around an axis to cause a seating surface on the belt removal unit to engage and reposition the belt.

* * * * *